Jan. 11, 1966  L. S. DRICKEN  3,228,714
RE-USABLE TYPE SNAP-ON COUPLINGS
Filed Aug. 6, 1962  2 Sheets-Sheet 1
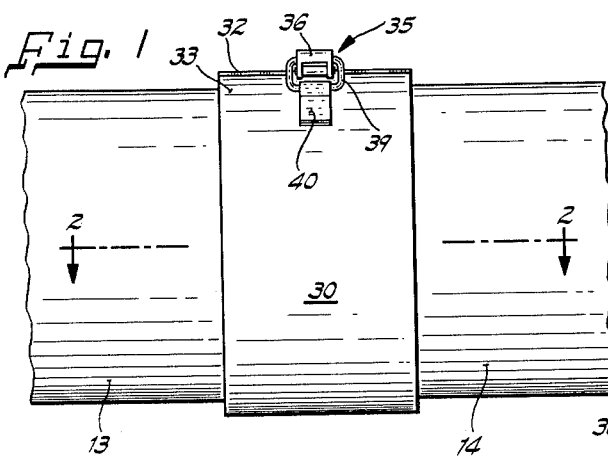
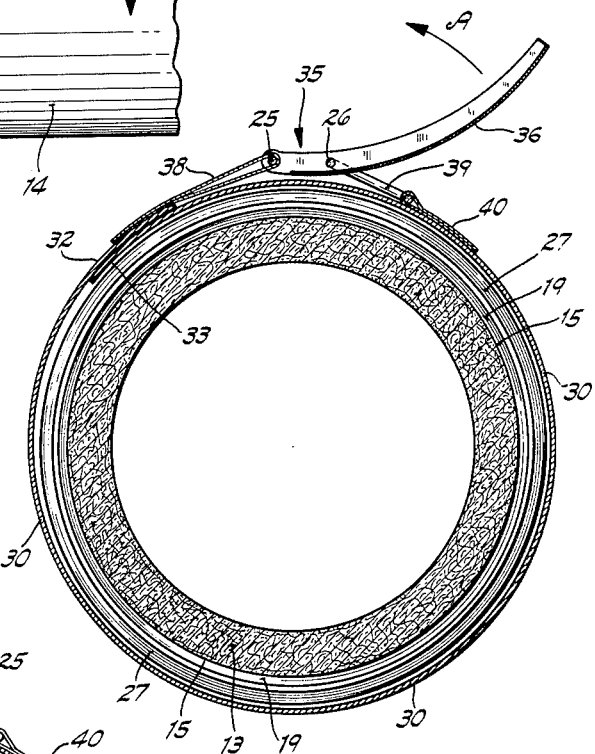
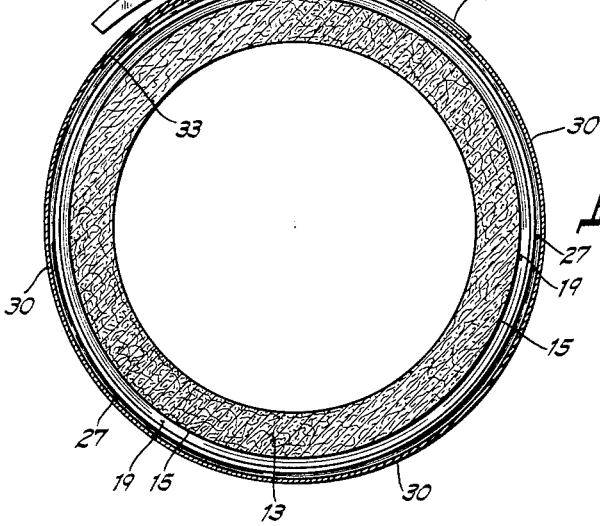
INVENTOR.
Leonard S. Dricken
BY
Attorney Jan. 11, 1966　　　　L. S. DRICKEN　　　　3,228,714
RE-USABLE TYPE SNAP-ON COUPLINGS
Filed Aug. 6, 1962　　　　　　　　　　　　　2 Sheets-Sheet 2
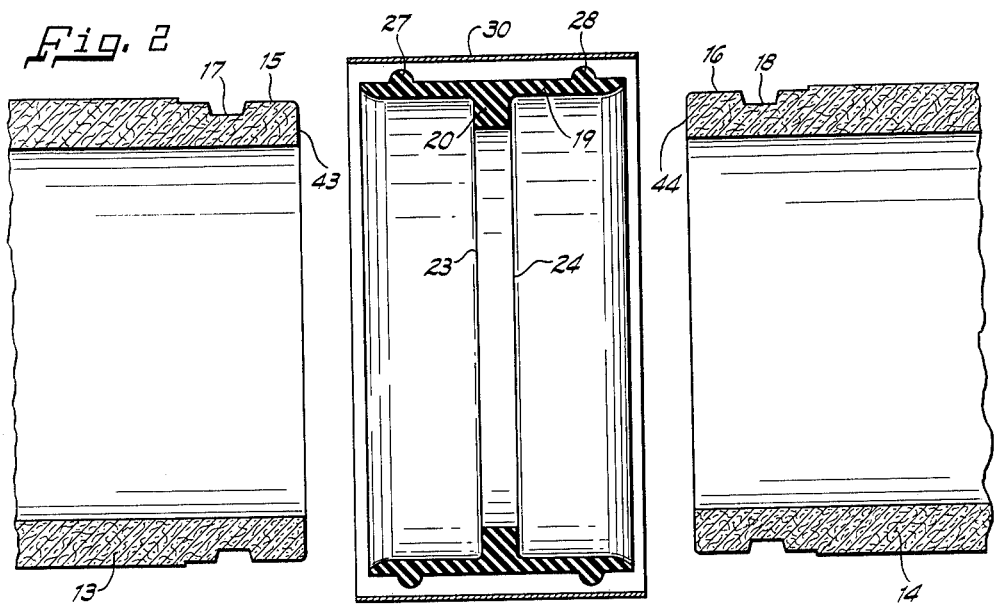
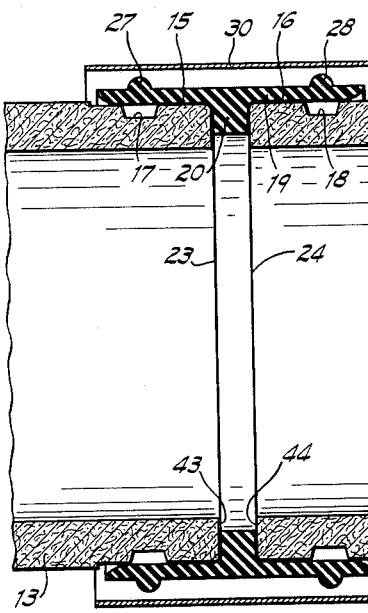
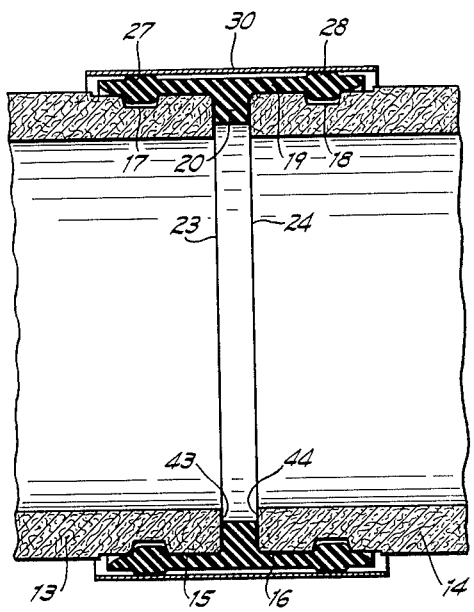
INVENTOR.
Leonard S. Dricken
BY
Attorney

United States Patent Office 3,228,714
Patented Jan. 11, 1966

3,228,714
RE-USABLE TYPE SNAP-ON COUPLINGS
Leonard S. Dricken, West Bend, Wis., assignor to Mc-
Graw-Edison Company, Milwaukee, Wis., a corporation
of Delaware
Filed Aug. 6, 1962, Ser. No. 215,174
2 Claims. (Cl. 285—236)

This invention relates to couplings and more particularly to an improved re-usable coupling for interconnecting conduit sections.

Providing low pressure conveyance lines for truck farming, irrigation, golf courses, dredging and well drilling, use during construction and emergency water service is best effected by the use of low-cost, readily portable materials and component parts wherein the various components may readily be assembled, disassembled and re-used. A low cost material available for such conduit purposes is fibre pipe; however, this material has the disadvantage that the couplings commonly used therewith are the driven friction type which are very adequate for permanent installations but less than satisfactory where dismantling and reassembly of the conduit is necessary for temporary service.

The coupling of the present invention utilizes a resilient sleeve into which adjoining conduit ends are inserted coaxially. Grooves in the outer periphery of the conduit ends underlie portions of the sleeve having a greater thickness than the balance of the sleeve that surrounds the conduit ends so that when the sleeve is compressed against the conduits by a belt or band drawn tightly about the sleeve, the sleeve material is forced into the groove to effect both a seal and coupling between the conduits. In addition the resilient connection enables moderate deviations from a coaxial alignment between the adjoining conduit sections to be accommodated without undue strain on such conduit sections. This ability to accommodate alignment irregularities is enhanced by including a resilient gasket between the confronting conduit end surfaces, which is provided in the preferred embodiment of this invention as an integral part of the resilient sleeve.

The preferred embodiment shown and described hereafter also contemplates the use of a one piece gasket and a unitary clamping assembly wherein the latter not only may be secured and released by a simple manual operation without tools, but also is devoid of any additional parts that must be assembled and would be subject to being misplaced or lost in the field.

It is an object of this invention to provide a removable snap-on type coupling for above ground uses with low pressure conduit.

It is a further object of this invention to provide a coupling that can effect a sealed connection between adjoining conduit ends without the use of tools.

It is a further object of this invention to provide a coupling that can be installed or disassembled and re-used by a single operator.

The invention and the novel features thereof may best be made clear by reference to the following description and the accompanying drawings in which:

FIG. 1 shows a preferred embodiment of the clamping device of this invention in a secured position about the end portions of two adjoining conduit parts;

FIG. 2 is an exploded section view along line II—II of FIG. 1 with the clamping means in a released condition;

FIG. 3 is a section view along lines 2—2 of FIG. 1 showing the clamping means in a relaxed position;

FIG. 4 is a section view along line 2—2 of FIG. 1;

FIG. 5 is an axial view showing clamping device in a relaxed position;

FIG. 6 is an axial view showing the clamping device in a secured position.

Referring to FIG. 2, conduit parts 13 and 14 have end portions 15 and 16 respectively which is the case of conduit having an irregular surface are turned at such ends to provide a cylindrical exterior peripheral surface. Annular recessed or grooves 17, 18 are formed in the cylindrical end portions of the respective conduit parts.

The coupling proper takes the form of two basic parts. The first of these is a resilient sleeve 19 which may be made of neoprene rubber or other similarly resilient material. Centrally located on the interior peripheral surface of the gasket or sleeve is an inwardly extending annulus 20 having surfaces 23 and 24 at right angles to the axis of the sleeve. On the outer periphery of the sleeve are two annular embossments or portions of increased thickness 27 and 28. The flared axial extremities of the sleeve are provided to afford easier insertion of the conduit end portions.

Encircling the sleeve in the assembled conditions is a clamping band 30 shown in FIG. 2 in an expanded or relaxed position. This clamping band is approximately coextensive with the sleeve in the axial direction and is formed of a continuous strip of metal having overlapping end portions 32 and 33. The ends of the clamping band are secured together by a commonly known hand operated toggle linkage 35 which appears in its open position in FIG. 5. The handle 36 is pivotally connected at one end to a metal strap 38 which strap is connected to the overlying end 32 of the band. A wire loop 39 is pivotally connected at one of its ends to an intermediate portion of the handle and at the other end is pivotally connected to a strap 40 which is attached to the underlying band end 33. As the handle is moved, or rotated, in the direction indicated by the arrow A, from the terminal position shown in FIG. 5 to the opposite terminal position illustrated in FIG. 6, an overcenter condition is effected as regards the forces acting on the pivotal connections 25 and 26 and thereby the clamping band is maintained in a clamping attitude.

In use the coupling is assembled by inserting the conduit end portions 15 and 16 into the sleeve until the end surfaces 43 and 44 of the conduits 13 and 14 respectively which are perpendicular to the axes of the conduits abut the radially inwardly extending side surfaces 23 and 24 of the annulus 20. In this position the exterior peripheral embossments 27 and 28 of the sleeve will overlie the conduit end portion recesses 17 and 18 respectively as shown in FIG. 3. The clamping ring 30 which was slipped over one of the conduit ends prior to insertion within the sleeve, is now brought into encircling alignment about the sleeve, as shown in its relaxed position in FIG. 3, and thereafter is drawn into its secured position by moving the clamping handle to the overcenter position of the toggle linkage as shown in FIG. 6. The clamping band thus compresses the sleeve and principally the annular embossments 27 and 28 thereby causing flexible material of the sleeve to be forced into the recesses 17 and 18 of the conduit part end portions to effect both coupling of the two conduits and sealing of the junctions between the sleeve and conduit parts.

To disassemble the coupling it is only necessary to move the handle on the clamping ring once again to its relaxed or unsecured position whereupon the conduit end portions can be withdrawn from the sleeve.

Although a specific structure has been shown and described, it is to be understood that the same was merely for the purpose of illustration and that changes and modifications may be readily made therein without departing from the spirit and scope of the invention.

What is claimed is:

1. A coupling means for connecting coaxially adjoining conduit ends comprising a sleeve of flexible elastomeric material presenting a central radially inwardly extending barrier annulus having radial wall portions facing each axial direction and a pair of annular projections extending radially outwardly from the outer periphery of said sleeve in axially spaced relation with said barrier annulus disposed therebetween; said sleeve presenting smooth uninterrupted interior wall surfaces from the barrier to each sleeve end; an annular recess in the external peripheral surface of each of said conduit end portions, each of said recesses being axially spaced from the respective conduit end surface so as to underlie one of said pair of outward extending annular portions when said conduit end is inserted into said sleeve in abutting relation to said barrier annulus and releasable clamping means surrounding said sleeve and selectively operable to apply a constrictive radially inward force about said sleeve whereby said outwardly extending annular portions are radially inwardly compressed causing material of said sleeve to be elastically deformed into and substantially fill said annular recesses to provide a fluid tight coupling between said conduit ends.

2. A releasable coupling means for connecting generally coaxially adjoining conduit ends comprising a sleeve of elastic, substantially incompressible material with a radially inwardly extending barrier annulus presenting radial surfaces in each axial direction and a pair of axially spaced annular portions projecting radially outward from said sleeve outer peripheral surface and disposed on opposite axial sides of said barrier annulus and equidistant therefrom, said sleeve presenting generally smooth uninterrupted cylindrical interior surfaces extending axially from said barrier annulus each terminating adjacent the respective axial end in an outwardly flared surface portion; a radial end surface presented by each said conduit end; an annular recess in the exterior surface of each of said conduit ends spaced a predetermined distance from the respective radial end surface, said predetermined distance being such that when said conduit ends are inserted into said sleeve to a position of abutting relation with said barrier annulus said pair of sleeve annular portions are disposed in respectively radially overlying relation to said annular recesses; a clamping band encircling said sleeve; and releasable linkage means secured to said clamping band and operable to draw said clamping band into constrictive radially inward compressive relation with said sleeve annular portions causing material of said sleeve to be elastically deformed radially inwardly into and substantially fill said annular recesses to effect compressive sealing engagement with said conduit ends.

References Cited by the Examiner

UNITED STATES PATENTS

| | | | |
|---|---|---|---|
| 1,186,813 | 6/1916 | McFerran | 285—417 |
| 2,114,366 | 4/1938 | Barnes | 285—369 |
| 2,731,280 | 1/1956 | Goodliffe | 285—420 |
| 2,888,277 | 5/1959 | Melsom | 285—149 |
| 2,980,143 | 4/1961 | Harris | 285—417 |

FOREIGN PATENTS 354,184   11/1937   Italy.

CARL W. TOMLIN, *Primary Examiner.*